(12) United States Patent
Kamiya et al.

(10) Patent No.: US 7,988,105 B2
(45) Date of Patent: Aug. 2, 2011

(54) FASTENER EASILY DETACHED FROM ATTACHED OBJECTS

(75) Inventors: Haruhisa Kamiya, Okazaki (JP); Toshio Iwahara, Okazaki (JP); Makoto Kato, Okazaki (JP)

(73) Assignee: Daiwa Kasei Kogyo Kabushiki Kaisha, Aichi (JP)

( * ) Notice: Subject to any disclaimer, the term of this patent is extended or adjusted under 35 U.S.C. 154(b) by 516 days.

(21) Appl. No.: 12/154,677

(22) Filed: May 22, 2008

(65) Prior Publication Data

US 2008/0313868 A1 Dec. 25, 2008

Related U.S. Application Data

(63) Continuation of application No. PCT/JP2006/323884, filed on Nov. 22, 2006.

(30) Foreign Application Priority Data

Nov. 24, 2005 (JP) ................................. 2005-338978
Oct. 27, 2006 (JP) ................................. 2006-292247

(51) Int. Cl.
*F16B 15/00* (2006.01)
(52) U.S. Cl. .......................................... 248/71; 248/909
(58) Field of Classification Search .................... 248/71, 248/74.1, 74.2, 74.3, 68.1, 909
See application file for complete search history.

(56) References Cited

U.S. PATENT DOCUMENTS

| 5,131,613 | A | * | 7/1992 | Kamiya et al. ............... 248/74.3 |
| 6,669,427 | B1 | | 12/2003 | Santelli, Jr. |
| 7,503,528 | B2 | * | 3/2009 | Adams et al. .................. 248/71 |
| 7,549,829 | B2 | * | 6/2009 | Okada et al. .................. 411/508 |
| 7,549,830 | B2 | * | 6/2009 | Cooley et al. ................. 411/508 |
| 2004/0144899 | A1 | * | 7/2004 | Rosemann et al. ............ 248/71 |
| 2005/0244250 | A1 | * | 11/2005 | Okada et al. .................. 411/508 |
| 2006/0231690 | A1 | * | 10/2006 | Cooley et al. ................. 248/71 |

FOREIGN PATENT DOCUMENTS

| CH | 601929 A5 * | 7/1978 |
| DE | 4326554 A1 | 2/1995 |
| DE | 295 10 606 U1 | 12/1996 |
| DE | 197 04 674 A1 | 8/1998 |
| JP | 7-151268 | 6/1995 |
| JP | 9-23541 | 1/1997 |
| JP | 2002-364779 | 12/2002 |

* cited by examiner

*Primary Examiner* — Ramon O Ramirez
(74) *Attorney, Agent, or Firm* — Lawrence G. Fridman

(57) ABSTRACT

A fastener for attaching an attached article to an attaching object is taught that preferably include a holding member that is arranged and constructed to hold the attached article, and an engagement leg that is arranged and constructed to engage an engagement hole formed in the attaching object. The engagement leg is connected to the holding member via a breakable connecting device. The connecting device is arranged and constructed to be easily broken when a substantial force is applied thereto.

14 Claims, 15 Drawing Sheets ent members 116 are urged to an inner surface 124a of the body panel 124, so that the engagement leg 114 is stably retained in the engagement hole 126 of the body panel 124. As a result, the fastener 101 is fixedly connected to the body panel 124. Thus, the wiring harness W can be reliably attached to the body panel 124.

FASTENER EASILY DETACHED FROM ATTACHED OBJECTS

THIS IS A CONTINUATION OF INTERNATIONAL PATENT APPLICATION PCT/JP2006/323884, FILED Nov. 22, 2006, WHICH CLAIMS PRIORITY OF JAPANESE PATENT APPLICATIONS S.N. 2005-338978, FILED Nov. 24, 200 AND S.N. 2006-292247 FILED Oct. 27, 2006

FIELD OF THE INVENTION

The present invention relates to fasteners for attaching attached articles, e.g., wiring harnesses, to attaching objects, e.g. body panels of a vehicle. More particularly, the present invention relates to fasteners that permit the attached articles to be easily detached from the attaching objects.

BACKGROUND OF THE INVENTION

A known fastener is taught by, for example, by Japanese Laid-Open Patent Publication No. 9-217864. The known fastener 101 includes a holding member 110 that can hold a wiring harness W (i.e., an attached article), an engagement leg 114, and a dish-shaped stabilizer 112 that is integrated with the holding member 110. The engagement leg 114 includes a center pillar 118 that upwardly vertically extends from the stabilizer 112, and a pair of engagement members 116 that respectively have shoulder portions S. The engagement members 116 outwardly oppositely extend from the free or upper end of the center pillar 118 in a folded fashion toward the stabilizer 112. The lower ends of the engagement members 116 are integrally connected to the stabilizer 112. Further, the center pillar 118 is composed of two portions, i.e., an upper and lower portions 118a and 118b, which are removably connected each other via a locking or coupling portion L. The locking portion L is arranged and constructed to be disengaged or unlocked when the center pillar 118 is applied with a pulling force in the axial direction (i.e., when the pillar lower portion 118b is pulled downwardly relative to the pillar upper portion 118a).

The operation of the fastener 101 thus constructed is as follows. First, in order to attach the wiring harness W to a body panel 124 (i.e., an attaching object) of a vehicle, as shown in FIG. 32, the wiring harness W is disposed longitudinally along the holding member 110 of the fastener 101 and is bundled therewith using a band (not shown), so that the fastener 101 is combined with the wiring harness W. Thereafter, the engagement leg 114 is simply pressed into an engagement hole 126 formed in the body panel 124, so that the engagement leg 114 is inserted thereinto while the engagement members 116 are respectively inwardly flexed. When the engagement leg 114 is sufficiently inserted into the engagement hole 126, the shoulder portions S of the engagement members 116 elastically engage an inner edge of the engagement hole 126, so that the engagement leg 114 is retained therein. Simultaneously, the stabilizer 112 elastically contacts an outer surface 124b of the body panel 124, thereby producing an elastic restoring force therein. Due to the elastic restoring force of the stabilizer 112, the shoulder portions S of the engagement members 116 are urged to an inner surface 124a of the body panel 124, so that the engagement leg 114 is stably retained in the engagement hole 126 of the body panel 124. As a result, the fastener 101 is fixedly connected to the body panel 124. Thus, the wiring harness W can be reliably attached to the body panel 124.

Conversely, in order to detach the wiring harness W from the body panel 24, the wiring harness W is pulled downwardly. As a result, the holding member 110 (and the stabilizer 112) is pulled downwardly (in a direction of pulling out the engagement leg 114). Consequently, the lower portion 118b of the engagement leg 114 is pulled relative to the pillar upper portion 118a, so that the locking portion L is unlocked. When the wiring harness W is further pulled after the locking portion L is unlocked, the engagement members 116 are contracted (i.e., inwardly flexed), so that the shoulder portions S of the engagement members 116 are disengaged from the inner edge of the engagement hole 126. As a result, the engagement leg 114 is released or pulled out from the engagement hole 126, so that the fastener 101 can be removed from the body panel 124. Thus, the wiring harness W can be detached from the body panel 124 together with the fastener 101.

The fastener 101 thus constructed can be easily removed from the body panel 124 when the holding member 110 is pulled. Therefore, when it is necessary to detach the wiring harness W from the body panel 124 in order to, for example, recycle or reuse of the attached wiring harness W, the wiring harness W can be relatively easily detached from the body panel 124 by simply pulling the wiring harness W.

However, in this known fastener 101, the upper and lower portions 118a and 118b of the center pillar 118 must be connected or locked in the locking portion L before the fastener 101 is used. Therefore, time consuming and labor intensive work is still required to attach the wiring harness W to the body panel 124. In addition, manufacturing costs of the fastener 101 are increased due to the need to separate the center pillar 118 to two portions.

SUMMARY OF THE INVENTION

It is, accordingly, an object of the present teachings to teach improved fastener that overcome the one or more problems of the known fastener.

In one aspect of the present teachings, a fastener for attaching an attached article to an attaching object may include a holding member that is arranged and constructed to hold the attached article, and an engagement leg that is arranged and constructed to engage an engagement hole formed in the attaching object. The engagement leg is connected to the holding member via a breakable connecting device. The connecting device is arranged and constructed to be easily broken when a substantial force is applied thereto.

According to the fastener of the present teachings, the attached article (e.g., a wiring harness) can be easily attached to the attaching object (e.g., a body panel of a vehicle) in one simple operation by pressing the engagement leg into the engagement hole formed in the attaching object. That is, the attached article can be easily attached to the attaching object without any time consuming operations.

Conversely, the attached article can be easily detached from the attaching object by simply pulling the attached article. This is because the connecting device of the fastener can be easily broken when the substantial force is applied thereto, so that the holding member is separated from the engagement leg. Therefore, the attached article can be detached from the attaching object without using specialized tools. As a result, the attached article can be quickly and efficiently detached from the attaching object.

Thus, this design is superior to known fastener. Therefore, the present fastener minimizes manual labor required for attaching and detaching of the attached article and provides a substantial improvement over known fastener.

Additional objects, features and advantages of the present invention will be readily understood after reading the following detailed description together with the accompanying drawings and the claims.

DESCRIPTION OF THE EMBODIMENTS OF THE INVENTION

Figure 1:
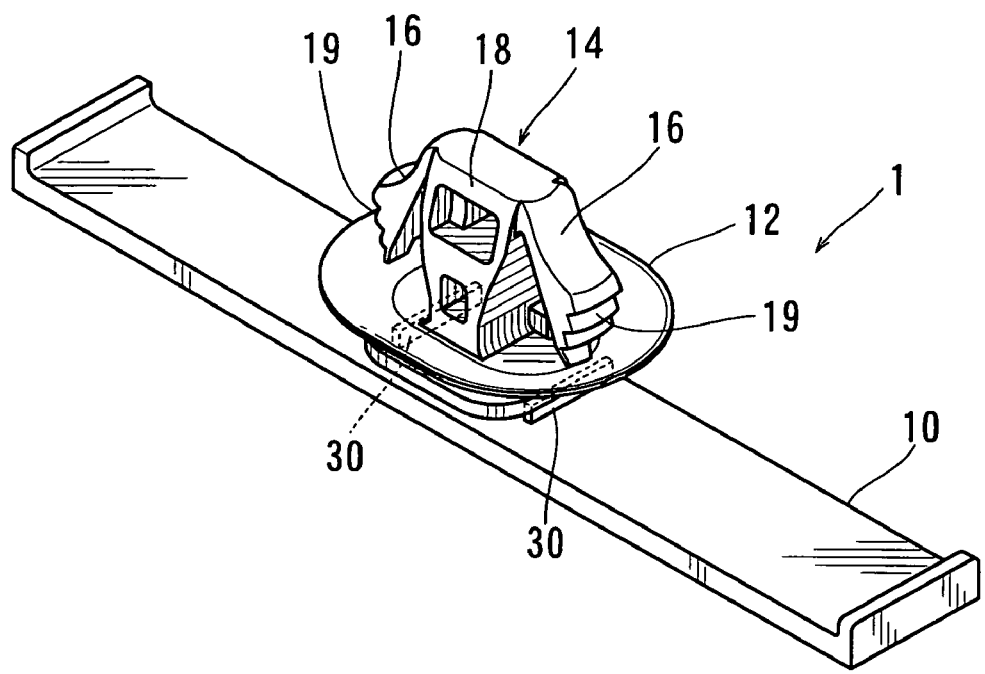
FIG. 1 is a perspective view of a fastener according to a first representative embodiment of the present teachings.
Figure 2:
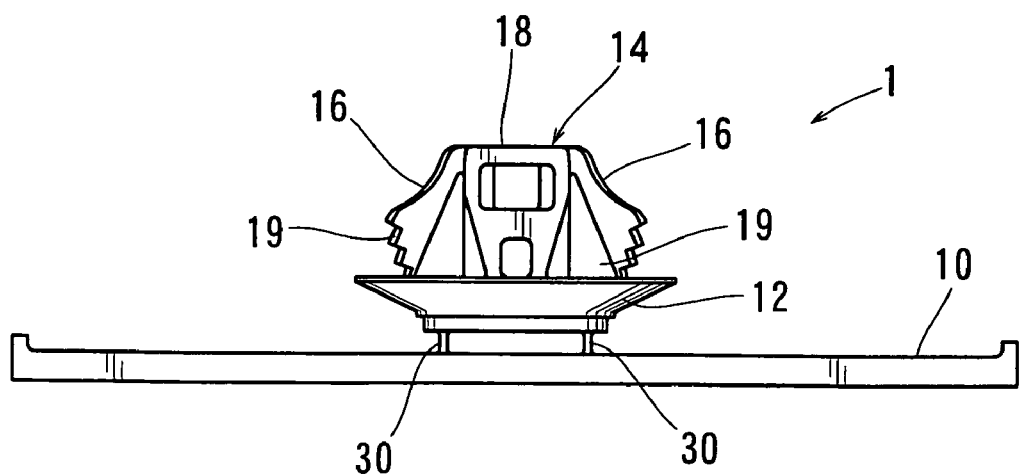
FIG. 2 is an elevational view of the fastener.
Figure 3:
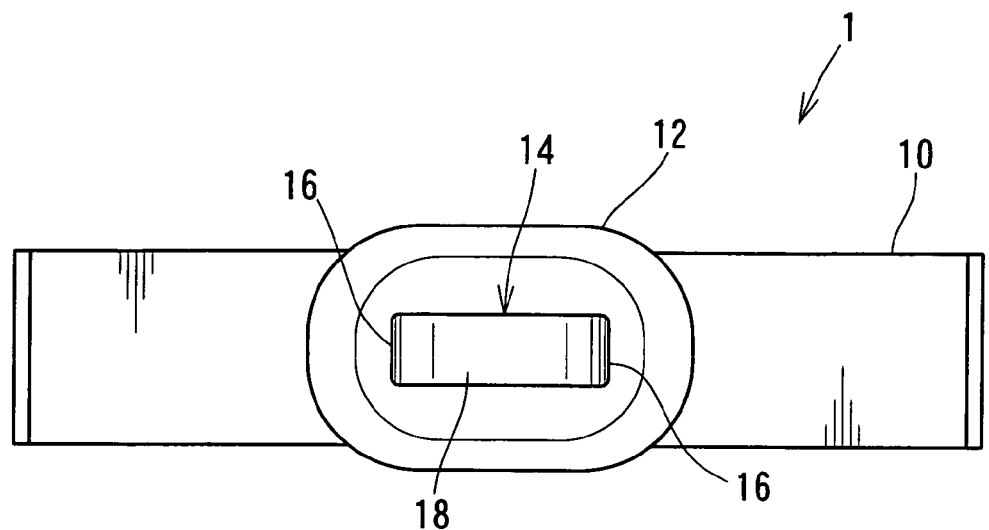
FIG. 3 is a plan view of the fastener.

In the following, a detailed representative embodiment of the present teachings will be described in detail with reference to FIGS. 1 to 31.

As shown in FIGS. 1 to 6, a fastener 1 may preferably be integrally formed as a unit or one piece by injection molding a synthetic resin, e.g., polyethylene. The fastener 1 includes an elongated plate-shaped holding member 10 that can hold a wiring harness W (i.e., an attached article), and an engagement leg 14 that can be inserted into an elongated engagement hole 26 formed in a body panel 24 (i.e., an attaching object) of a vehicle.

Figure 4:
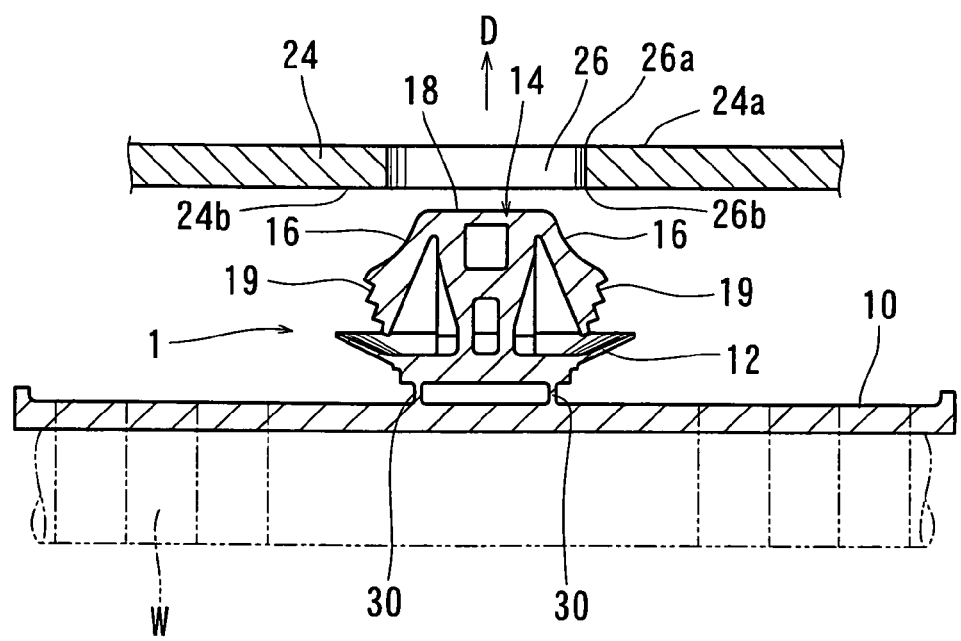
FIG. 4 is a cross-sectional view of the fastener, which illustrates a condition before the fastener is connected to a body panel.

As best shown in FIGS. 1 and 4, the engagement leg 14 is centrally positioned on the holding member 10. The engagement leg 14 may include a cup or dish-shaped stabilizer 12, a center pillar 18 that upwardly vertically extends from the stabilizer 12, and a pair of engagement members 16 that outwardly oppositely extend from the free or upper end of the center pillar 18 in a folded fashion toward the stabilizer 12. As will be apparent from FIG. 4, the engagement members 16 are arranged and constructed such that the external distance therebetween is greater than the diameter of the engagement hole 26.

Figure 5:
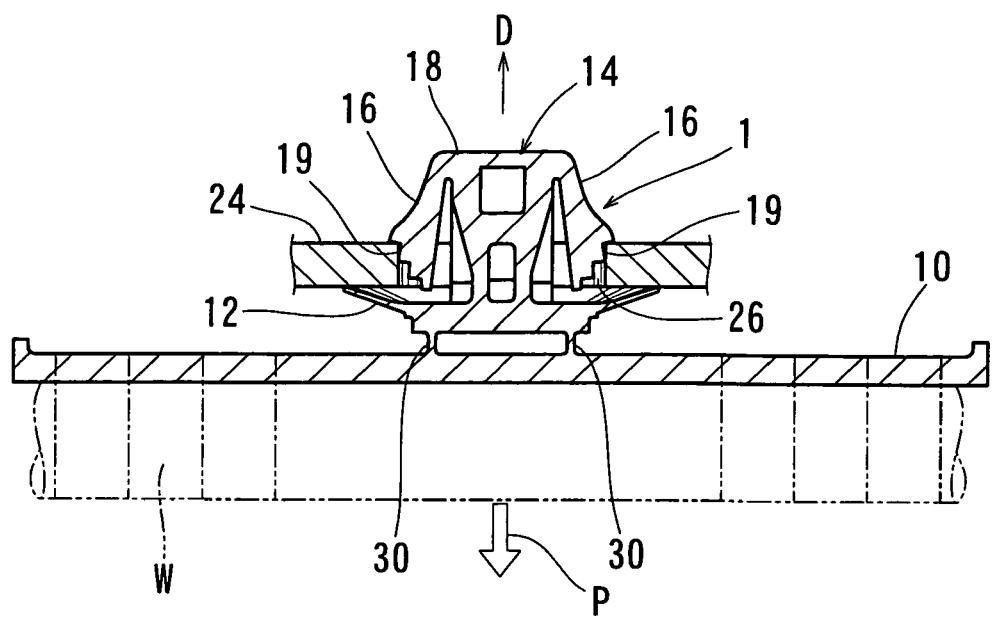
FIG. 5 is a cross-sectional view of the fastener, which illustrates a condition after the fastener is connected to the body panel.

As best shown in FIG. 4, each of the engagement members 16 may have a free end. Therefore, the engagement members 16 can be elastically flexed inwardly toward the center pillar 18. The free end of each engagement member 16 may have an engagement section 19. The engagement section 19 has a plurality of (three in the drawings) steps, so as to effectively engage an inner edge 26a of the engagement hole 26 of the body panel 24 when the engagement leg 14 is inserted into the engagement hole 26 (FIG. 5).

As best shown in FIG. 4, the stabilizer 12 may have an external size that is greater than the diameter of the engagement hole 26. Also, the stabilizer 12 is arranged and constructed such that the periphery thereof can elastically contact an outer surface 24b of the body panel 24 when the engagement sections 19 engage the inner edge 26a of the engagement hole 26 of the body panel 24.

Further, as best shown in FIGS. 1, 2, 4 and 5, the stabilizer 12 is connected to the holding member 10 via a breakable connecting device. In this embodiment, the connecting device may be constructed as a pair of connecting members 30 that are vertically positioned therebetween. The connecting members 30 may preferably be oppositely positioned in parallel with each other along a longitudinal direction of the holding member 10. In this embodiment, the connecting members 30 may preferably be formed as a pair of planar thin plate-shaped connecting strips, so as to be easily broken or fractured when a substantial force is applied thereto. Therefore, the connecting members 30 can be broken or fractured, for example, when the holding member 10 is purposely pulled relative to the engagement leg 14 (the stabilizer 12). Naturally, the connecting members 30 may preferably be designed so as not to be broken or fractured if they are applied with a small force, e.g., a vibration force caused by movement of a vehicle.

The operation of the fastener 1 thus constructed is as follows. First, in order to attach the wiring harness W to the body panel 24 of the vehicle, as shown in FIG. 4, the wiring harness W is disposed longitudinally along the holding member 10 of the fastener 1 and is bundled therewith using a band or other such tying members (not shown), so that the fastener 1 is combined with the wiring harness W. Thereafter, the engagement leg 14 of the fastener 1 is pressed into the engagement hole 26 formed in the body panel 24 along an insertion direction D shown by arrow in FIG. 4. As a result, the engagement leg 14 is inserted into the engagement hole 26 while the engagement members 16 are respectively elastically inwardly flexed by contacting an outer edge 26b of the engagement hole 26. When the engagement leg 14 reaches to a predetermined position in the engagement hole 26, as shown in FIG. 5, the engagement members 16 are respectively elastically outwardly restored or spread, so that the engagement section 19 of the engagement members 16 elastically engage the inner edge 26a of the engagement hole 26. As a result, the engagement leg 14 is retained therein. Simultaneously, the periphery of the stabilizer 12 elastically contacts the outer surface 24b of the body panel 24, thereby producing an elastic restoring force therein. Due to the elastic restoring force of the stabilizer 12, the engagement section 19 of the engagement members 16 are urged to an inner surface 24a of the body panel 24, so that the engagement leg 14 is reliably retained in the engagement hole 26 of the body panel 24. Thus, as shown in FIG. 5, the fastener 1 is fixedly connected to the body panel 24. As a result, the wiring harness W can be attached to the body panel 24.

Further, as described above, when the engagement leg 14 reaches to the predetermined position in the engagement hole 26, the periphery of the stabilizer 12 elastically contacts the outer surface 24b of the body panel 24. Therefore, the stabilizer 12 may also function as a sealing member, so that the engagement hole 26 is effectively sealed or closed. That is, the stabilizer 12 (the engagement leg 14) may have waterproof function.

Figure 6:
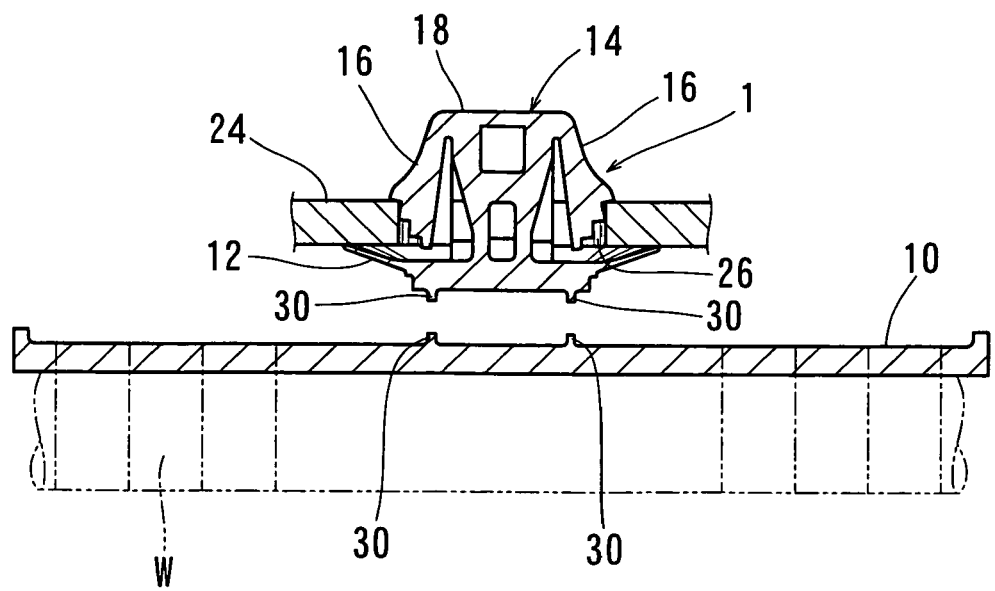
FIG. 6 is a cross-sectional view of the fastener, which illustrates a condition in which a engagement leg is separated from a holding member.

Conversely, in order to detach the wiring harness W from the body panel 24, in a condition shown in FIG. 5 in which the wiring harness W is attached to the body panel 24, the wiring harness W is simply pulled downwardly. At this time, the holding member 10 is pulled in the direction substantially opposite to the insertion direction D (i.e., in a direction to pulling out the engagement leg 14), so that a pulling force P is applied to the connecting members 30 in the same direction. As a result, as shown in FIG. 6, the connecting members 30 are broken or fractured, so that the holding portion 10 is separated from the engagement leg 14 (the stabilizer 12). The connecting members 30 are formed so as to be broken when the substantial force is applied thereto. Thus, the wiring harness W can be detached from the body panel 24 together with the holding portion 10 of the fastener 1. As will be recognized, the engagement leg 14 of the fastener 1 is left on the body panel 24.

As shown in FIGS. 4 to 6, in this embodiment, an upper panel is exemplified as the body panel 24 of the vehicle. However, the body panel 24 may be a side panel, a lower panel or other such panels.

Figure 7:
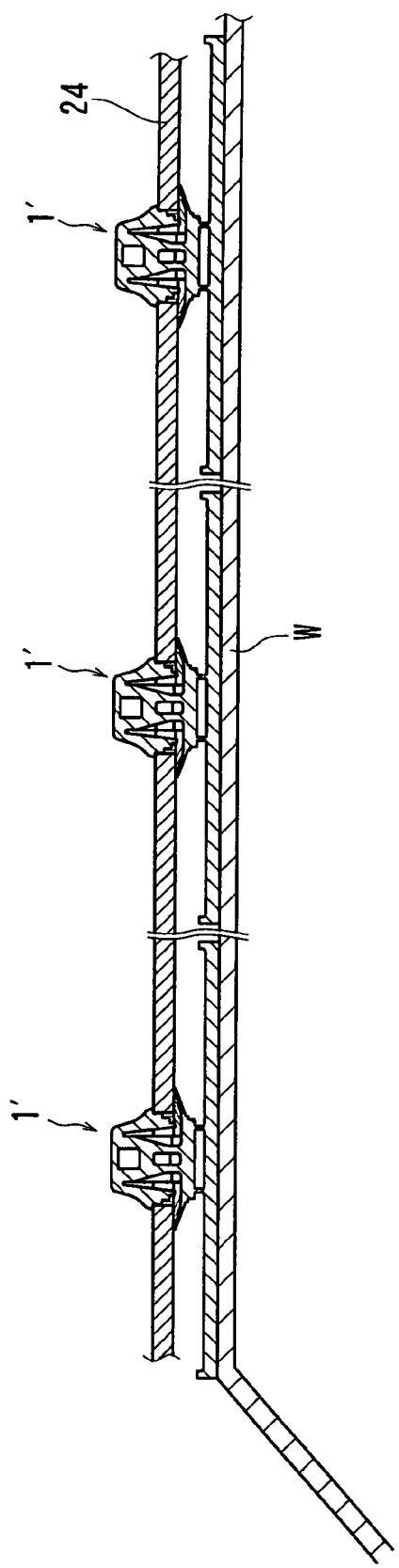
FIG. 7 is a cross-sectional view of the fastener, which illustrates a condition in which a wiring harness is attached to the body panel via a plurality of fasteners.

Further, as shown in FIG. 7, the wiring harness W is generally attached to the body panel 24 using a plurality of fasteners 1' that respectively have the same construction as the fastener 1. Even in that case, the wiring harness W can be attached to and detached from the body panel 24 in the same manner as described above.

According to the fastener 1 (the fasteners 1') of the present teachings, the wiring harness W can be easily attached to the body panel 24 without any additional troublesome operations. In addition, the wiring harness W attached to the body panel 24 can be easily detached from the body panel 24 by simply pulling the wiring harness W. That is, the wiring harness W can be easily detached from the body panel 24 without applying a considerably large force to the engagement leg 14. Therefore, the wiring harness W can be detached from the body panel 24 without using specialized tools. As a result, the wiring harness W can be quickly and efficiently detached from the body panel 24. This may lead to easy recycling of the wiring harness W.

Figure 8:
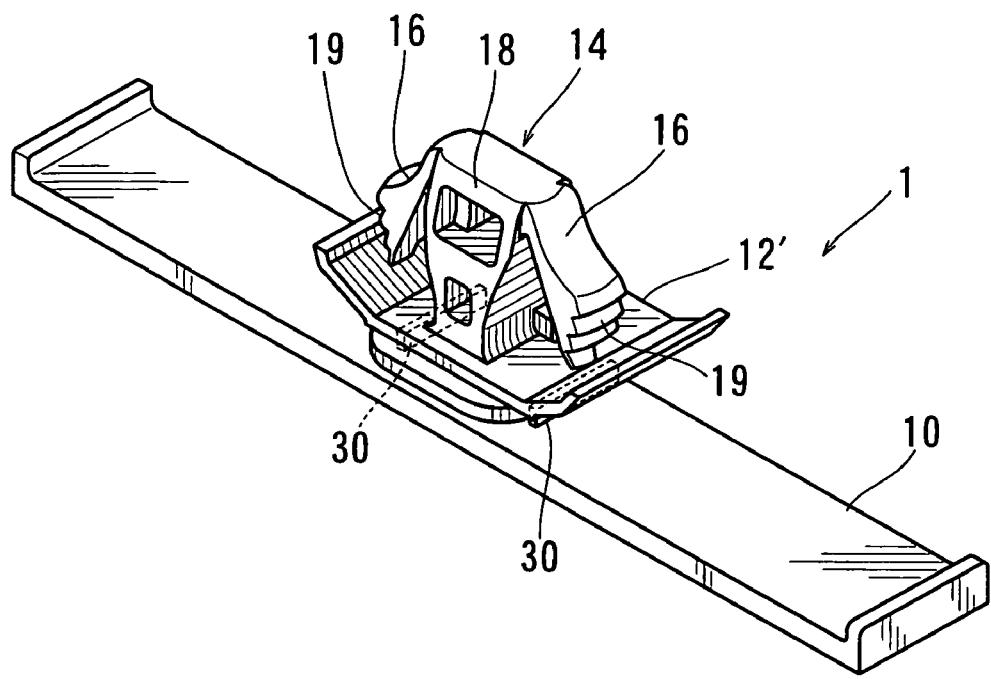
FIG. 8 is a view similar to FIG. 1, which illustrates a modified form of a stabilizer.

The embodiment of the present invention can be modified, if necessary. For example, the stabilizer 12 of the engagement leg 14 is not limited to the particular design as described above. Therefore, as shown in FIG. 8, the stabilizer 12 can be changed to a gutter-shaped stabilizer 12', if necessary. Such a stabilizer 12' may be useful when the engagement leg 14 is not required to have the waterproof function.

Further, the connecting device is not limited to the particular design (i.e., the connecting members 30) as described above. For example, as shown in FIGS. 9 to 14 and 26 to 28, the connecting device can be variously modified, if necessary.

Figure 9:
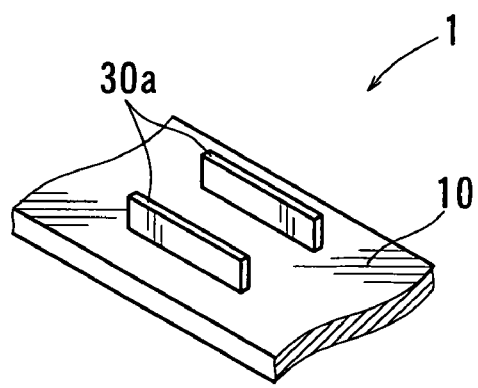
FIGS. 9 to 14 are views illustrating possible forms of a connecting device, in which the engagement leg is omitted for explanatory purposes.
Figure 10:
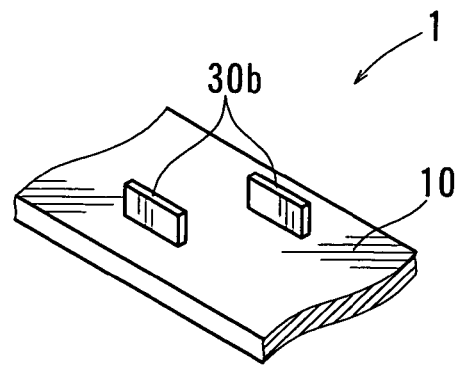
Figure 11:
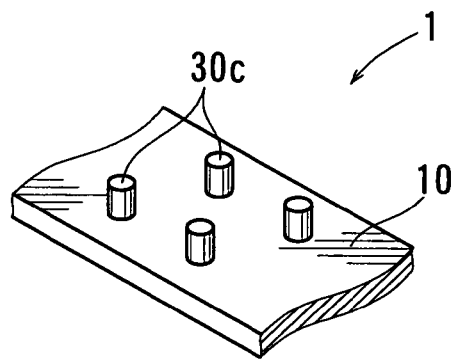
Figure 12:
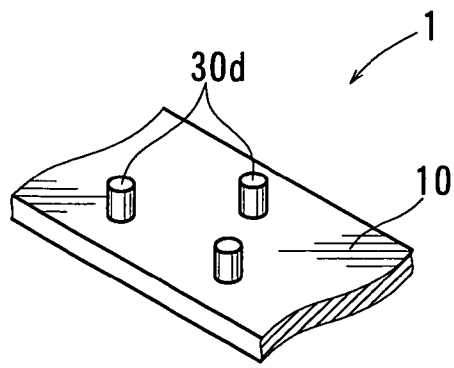

In FIG. 9, similar to the connecting member 30, the connecting device is constructed as a pair of connecting members 30a that are respectively formed as thin plate-shaped connecting strips. However, the connecting members 30a thus constructed are oppositely positioned in parallel with each other along a transverse direction of the holding member 10. In FIG. 10, the connecting device is constructed as a pair of connecting members 30b that are respectively formed as shortened thin plate-shaped connecting strips. The connecting members 30b thus constructed are oppositely positioned in parallel with each other along the transverse direction of the holding member 10 and are shifted or displaced each other along the longitudinal direction of the holding member 10. In FIG. 11, the connecting device is constructed as four connecting members 30c that are respectively formed as smaller-diameter cylindrical pin-shaped connecting strips. The connecting members 30c thus constructed are positioned in a rectangular pattern on the holding member 10. In FIG. 12, the connecting device is constructed as three connecting members 30d that are respectively formed as smaller-diameter cylindrical pin-shaped strips. The connecting members 30d thus constructed are positioned in a rectangular pattern on the holding member 10.

Figure 13:
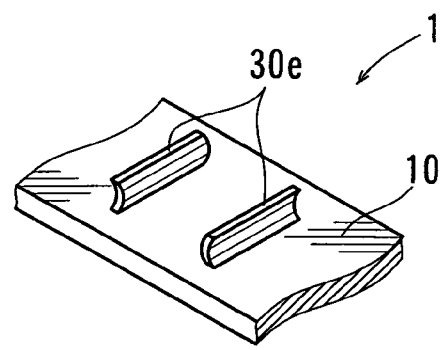
Figure 14:
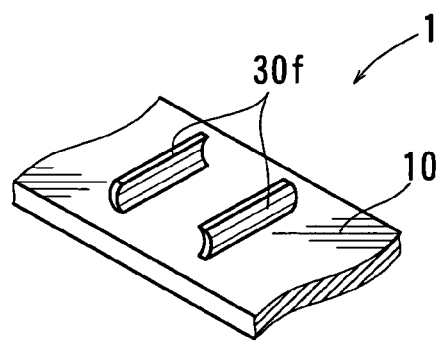

In FIG. 13, the connecting device is constructed as a pair of connecting members 30e that are respectively formed as inwardly curved thin plate-shaped connecting strips. The connecting members 30e thus constructed are oppositely positioned in parallel with each other along the longitudinal direction of the holding member 10. In FIG. 14, the connecting device is constructed as a pair of connecting members 30f that are respectively formed as outwardly curved thin plate-shaped connecting strips. The connecting members 30f thus constructed are oppositely positioned in parallel with each other along the longitudinal direction of the holding member 10.

Figure 26:
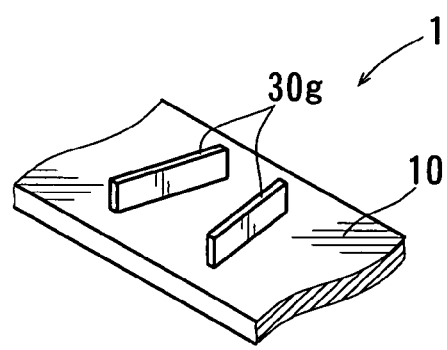
FIGS. 26 to 28 are views illustrating further possible forms of the connecting device, in which the engagement leg is omitted for explanatory purposes.
Figure 27:
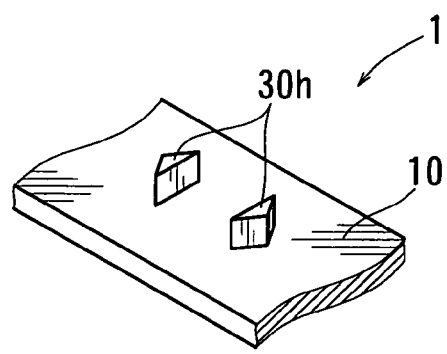
Figure 28:
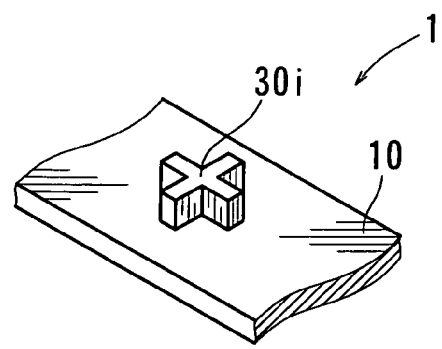

In FIG. 26, the connecting device is constructed as a pair of connecting members 30g that are respectively formed as thin plate-shaped connecting strips. The connecting members 30g thus constructed are oppositely angularly positioned (i.e., in nonparallel with each other) along a longitudinal direction of the holding member 10. In FIG. 27, the connecting device is constructed as a pair of connecting members 30h that are respectively formed as triangle pole-shaped (pin-shaped) connecting strips. The connecting members 30h thus constructed are oppositely positioned along the longitudinal direction of the holding member 10. In FIG. 28, the connecting device is constructed as a single connecting member 30i that is formed as a pin-shaped strip having a cross-shape in cross section. The connecting members 30i thus constructed are desirably positioned on the holding member 10.

Further, as shown in FIGS. 15 to 20, the connecting members 30 can be reinforced or rigidified by a reinforcement device, if necessary. Further, the reinforcement device may preferably be integrally formed when the fastener 1 is formed by the injection molding. However, the reinforcement device can be separately formed from a resinous material that has a rigidity greater than the material of the fastener 1. In that case, the reinforcement device may preferably be bonded to or combined with the fastener 1 (the holding member 10 and the stabilizer 12) by adhesion, welding or other such means.

Figure 15:
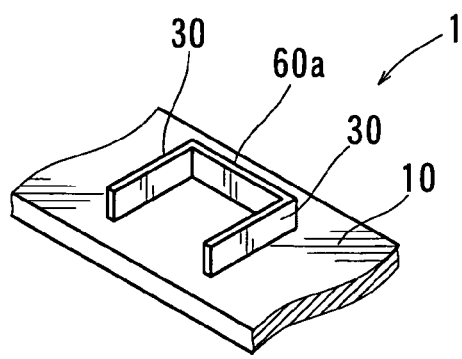
FIGS. 15 to 20 are views illustrating possible forms of a reinforcing device, in which the engagement leg is omitted for explanatory purposes, in which the engagement leg is omitted for explanatory purposes.
Figure 16:
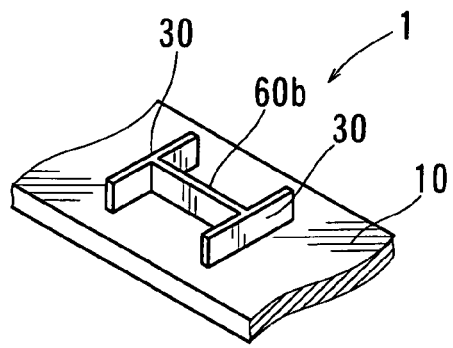
Figure 17:
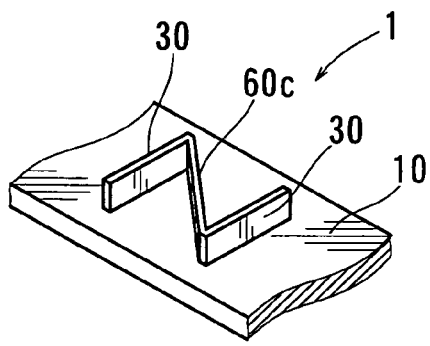

In FIG. 15, the reinforcement device is constructed as a reinforcement member 60a that is formed as a thin plate-shaped reinforcement strip. The reinforcement member 60a thus formed is positioned between the connecting members 30 and is integrally connected to the adjacent end portions of the connecting members 30, so that the reinforcement member 60a and the connecting members 30 may form a U-shaped structure. In FIG. 16, the reinforcement device is constructed as a reinforcement member 60b that is formed as a thin plate-shaped reinforcement strip. The reinforcement member 60b thus formed is positioned between the connecting members 30 and is integrally connected to the central portions of the connecting members 30, so that the reinforcement member 60b and the connecting members 30 may form a H-shaped structure. In FIG. 17, the reinforcement device is constructed as a reinforcement member 60c that is formed as a thin plate-shaped reinforcement strip. The reinforcement member 60c thus formed is diagonally positioned between the connecting members 30 and is integrally connected to the diagonal end portions of the connecting members 30, so that the reinforcement member 60c and the connecting members 30 may form a N-shaped structure.

Figure 18:
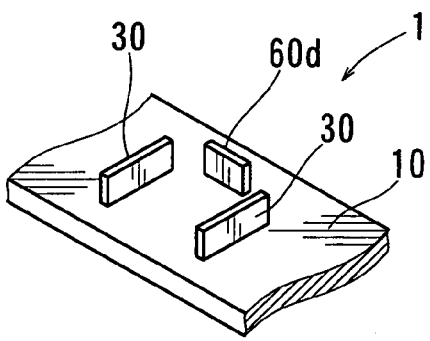

Moreover, in FIG. 18, the reinforcement device is constructed as a reinforcement member 60d that is formed as a shortened thin plate-shaped reinforcement strip. The reinforcement member 60d thus formed is positioned between the adjacent end portions of the connecting members 30, so as to be appropriately spaced apart from the connecting members 30.

Figure 19:
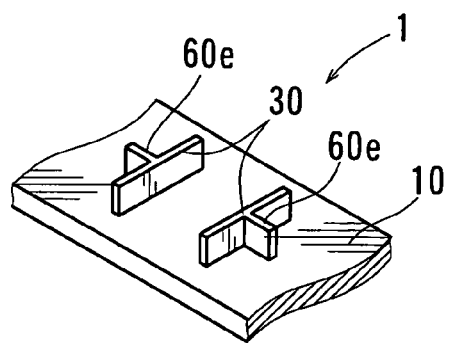

In FIG. 19, the reinforcement device is constructed as a pair of reinforcement members 60e that are formed as thin plate-shaped reinforcement strips. The reinforcement members 60e thus formed are respectively positioned outside of the connecting members 30 and are integrally connected to the central portions of the connecting members 30, so that the reinforcement members 60e and the connecting members 30 may form a pair of opposed T-shaped structures.

Figure 20:
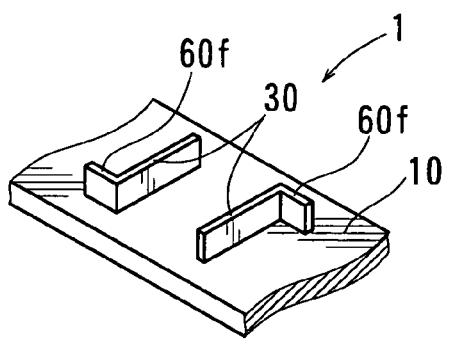

In FIG. 20, the reinforcement device is constructed as a pair of reinforcement members 60f that are formed as thin plate-shaped reinforcement strips. The reinforcement members 60f thus formed are respectively positioned outside the connecting members 30 and are integrally connected to the diagonal end portions of the connecting members 30, so that reinforcement members 60f and the connecting members 30 may form a pair of opposed L-shaped structures.

Further, as shown in FIGS. 21 to 25, the connecting members 30 (the connecting device) can be provided with a weakening device, so as to be further easily broken or fractured when the force is applied thereto, if necessary. Such a weakening device may provide an additional advantage that the connecting members 30 can be broken at a predetermined position.

Figure 21:
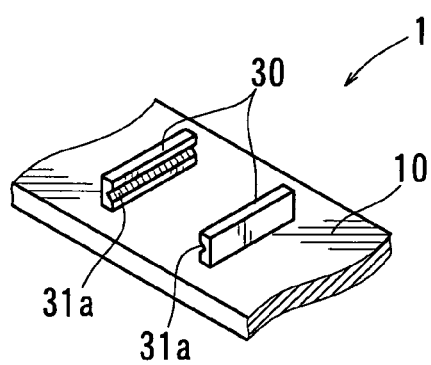
FIGS. 21 to 25 are views illustrating possible forms of a weakened portion, in which the engagement leg is omitted for explanatory purposes.
Figure 22:
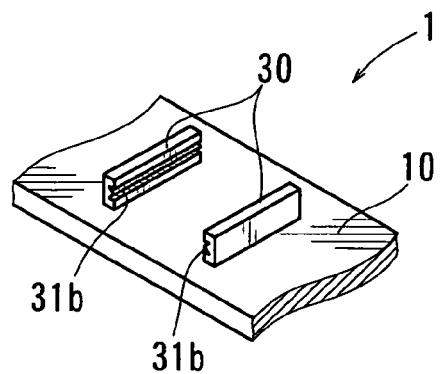

In FIG. 21, the weakening device is formed as two grooves 31a that respectively have a V-shape in cross section. The grooves 31a are respectively formed in the inner opposite surfaces of the connecting members 30, so as to extend along the longitudinal direction thereof. In FIG. 22, the weakening device is formed as two grooves 31b that respectively have a W-shape in cross section. The grooves 31b are respectively formed in the inner opposite surfaces of the connecting members 30, so as to extend along the longitudinal direction thereof.

Figure 23:
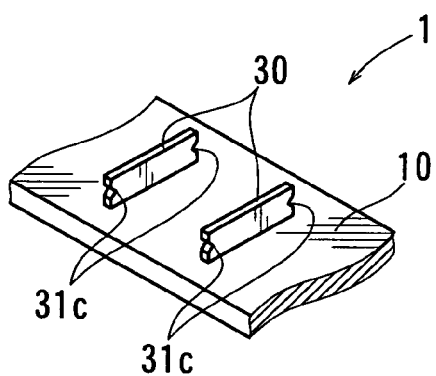
Figure 24:
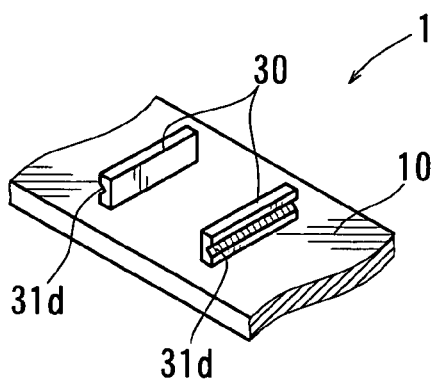
Figure 25:
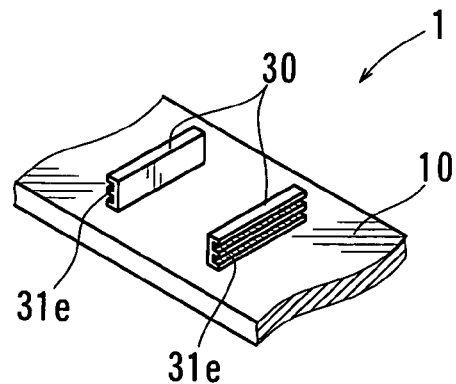

In FIG. 23, the weakening device is formed as two pairs of notches 31c that respectively have a V-shape in cross section. Each pair of the notches 31c are respectively formed in the longitudinal end surfaces of each of the connecting members 30, so as to longitudinally aligned with each other. In FIG. 24, the weakening device is formed as two grooves 31d that respectively have a V-shape in cross section. The grooves 31d are respectively formed in the outer opposite surfaces of the connecting members 30, so as to extend along the longitudinal direction thereof. In FIG. 25, the weakening device is formed as two pairs of grooves 31e that respectively have a U-shape in cross section. Respective pairs of the grooves 31b are respectively formed in the outer opposite surfaces of the connecting members 30, so as to extend in parallel with each other along the longitudinal direction thereof.

As will be appreciated, such a weakening device can be formed in the modified connecting members 30a to 30i and/or the reinforcement members 60a to 60i.

Further, the holding member 10 is not limited to the particular design as described above. For example, as shown in FIGS. 29 to 31, various types of holding members 10a to 10c can be used, if necessary.

Figure 29:
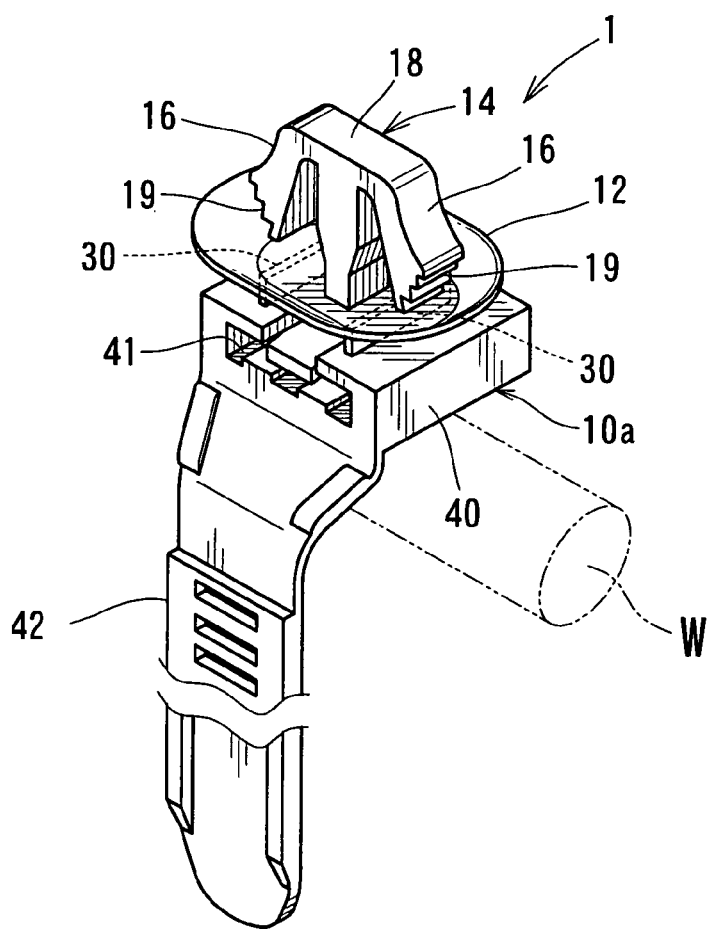
FIGS. 29 to 31 are views similar to FIG. 1, which illustrates modified forms of the holding member.

The holding member 10a shown in FIG. 29 includes a buckle 40, and a tying belt 42 integrally connected to the buckle 40. The buckle 40 has a through hole 41 into which the tying belt 42 is inserted. The central portion of the buckle 40 is connected to the engagement leg 14 via the connecting members 30. According to the holding member 10a thus constructed, it is possible to quickly combine the fastener 1 with the wiring harness W.

Figure 30:
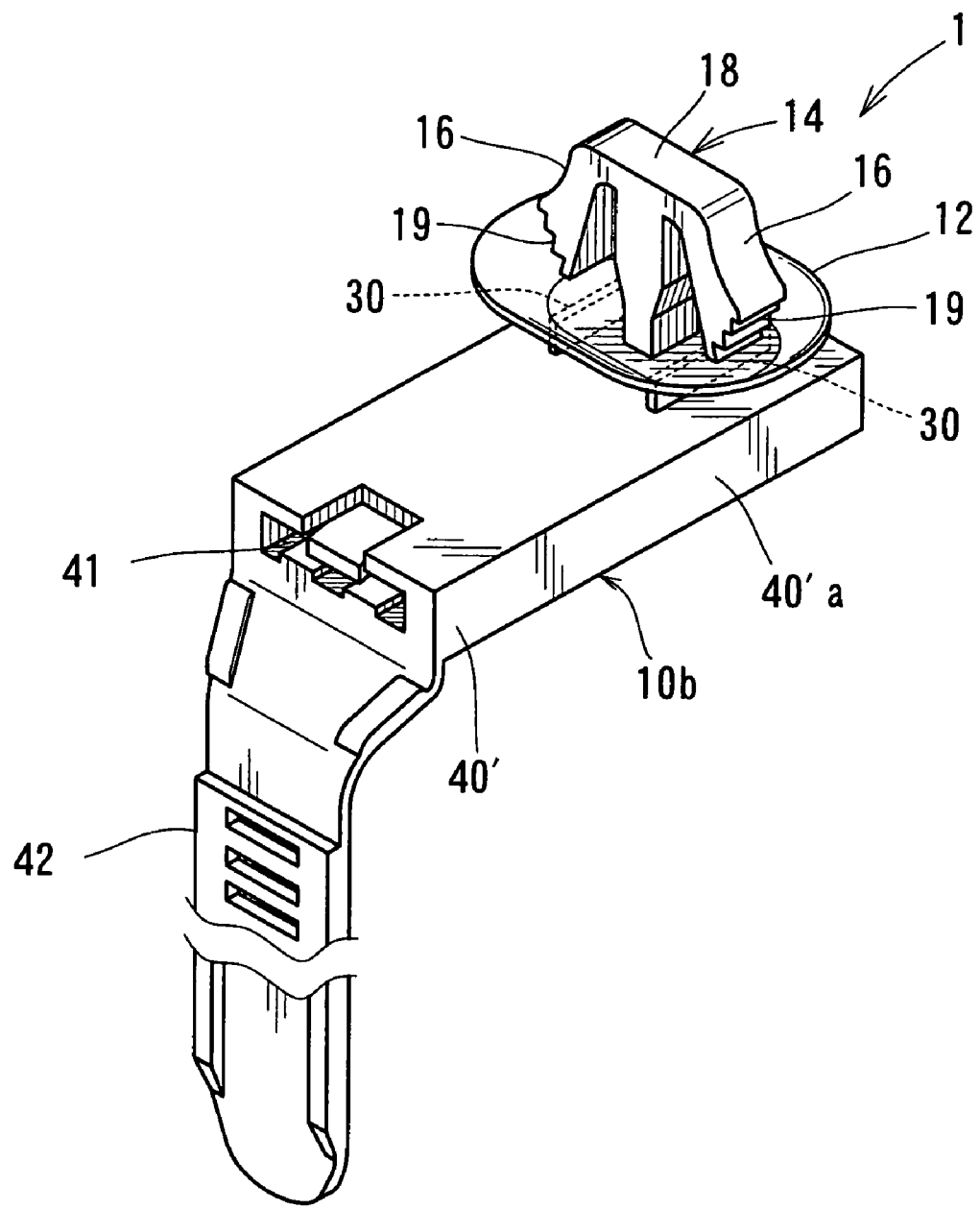

The holding member 10b shown in FIG. 30 has the same construction as the holding member 10a except for a buckle 40'. Unlike the buckle 40, the buckle 40' has an elongated portion 40'a. The elongated portion 40'a of the buckle 40' is connected to the engagement leg 14 via the connecting members 30. Further, the fastener 1 having the holding member 10b thus constructed is generally referred to as an offset type fastener.

Figure 31:
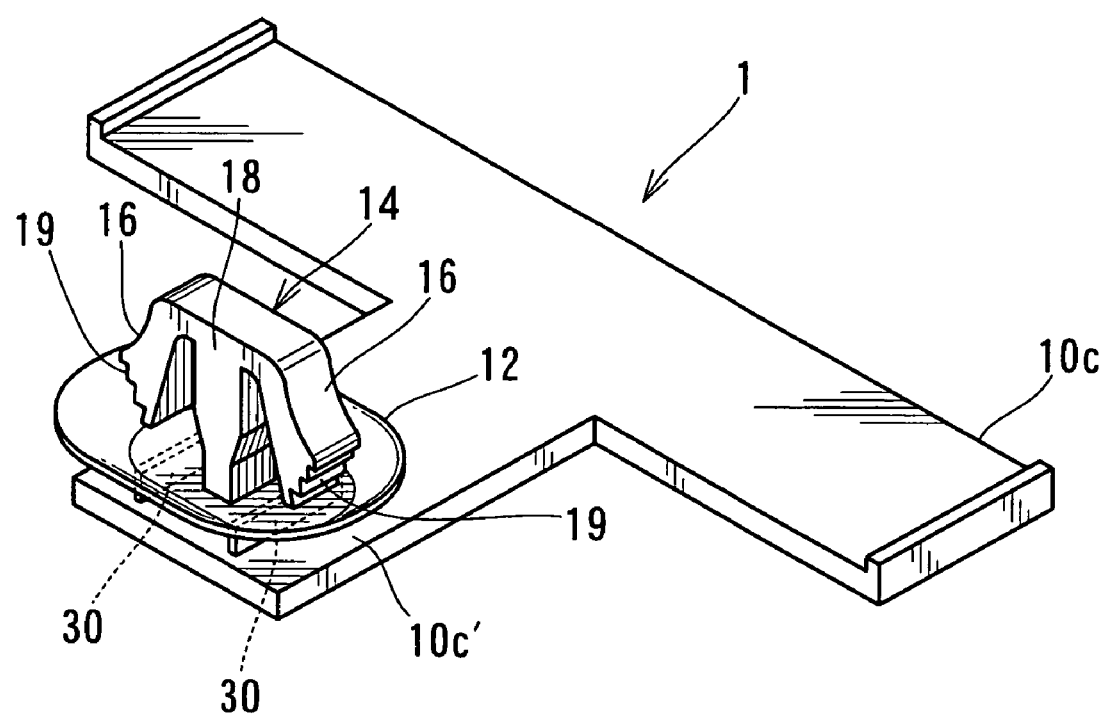
Figure 32:
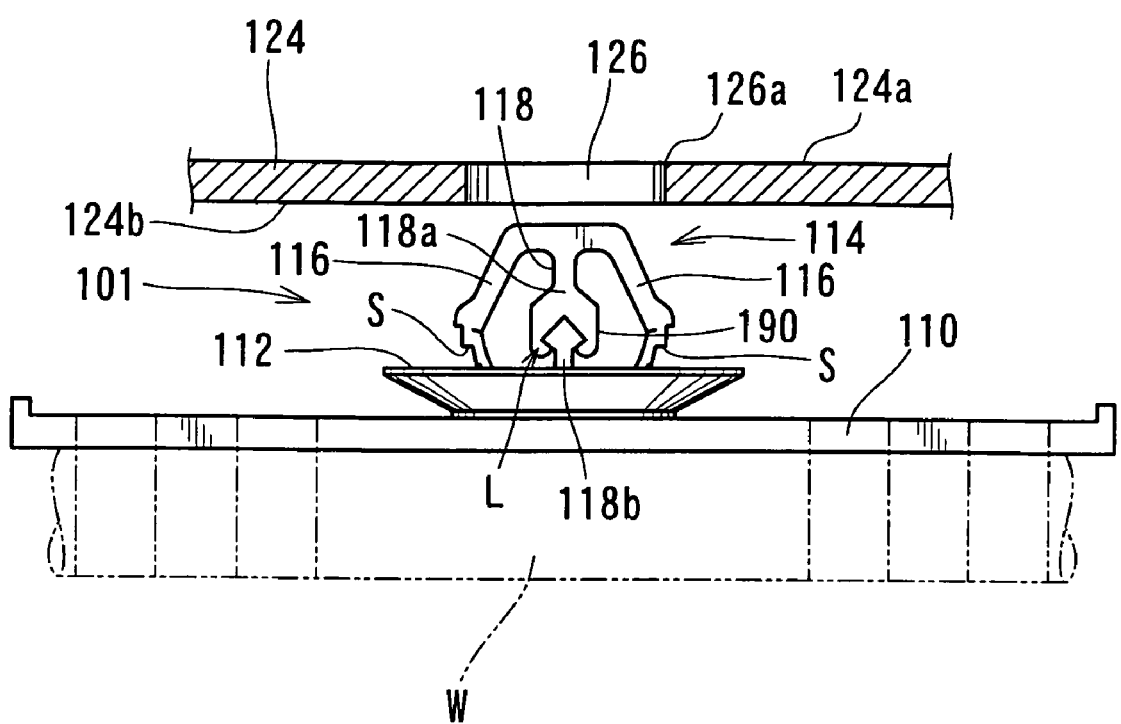
FIG. 32 is a cross-sectional view of a prior art fastener, which illustrates a condition before the fastener is connected to a body panel.

The holding member 10c shown in FIG. 31 has the same construction as the holding member 10 except that the holding member 10c has an integrated side extension 10c'. In this holding member 10c, the side extension 10c' of the holding member 10c is connected to the engagement leg 14 via the connecting members 30. Further, the fastener 1 having the holding member 10c thus constructed is also referred to as an offset type fastener.

A representative embodiment of the present invention has been described in detail. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present teachings.

What is claimed is:

1. A fastener for attaching an attached article to an attaching object, comprising:
    a holding member arranged and constructed to hold the attached article;
    an engagement leg comprising a center pillar extending outwardly from a stabilizer, the center pillar arranged and constructed to engage an engagement hole formed in the attaching object, the holding member being separated from the stabilizer of the engagement leg by a hollow space; and
    the stabilizer of the engagement leg is connected to the holding member via at least a pair of spaced from each other connecting members extending within the hollow space, the connecting members formed with a weakening device also disposed within the hollow space;
    wherein the connecting members are arranged and constructed to be easily broken at said weakening device to facilitate separation between the stabilizer of the engagement leg and the holding member when a force is applied thereto.

2. The fastener as defined in claim 1, wherein the connecting members comprise a pair of spaced from each other plate-shaped connecting strips that are oppositely positioned.

3. The fastener as defined in claim 1, wherein the connecting members comprise a plurality of spaced from each other pin-shaped connecting strips.

4. The fastener as defined in claim 1, wherein the connecting members further comprise a reinforcement device.

5. The fastener as defined in claim 4, wherein the reinforcement device comprises one or more reinforcement members.

6. The fastener as defined in claim 5, wherein the connecting members comprise a pair of plate-shaped connecting strips, wherein the one or more reinforcement members comprises one or more plate-shaped reinforcement strips, and wherein the one or more reinforcement strips are connected to or positioned adjacent to the connecting strips.

7. The fastener as defined in claim 1, wherein the connecting members comprise a pair of plate-shaped connecting strips, wherein the weakening device comprises one or more grooves that are formed in the connecting strips.

8. The fastener as defined in claim 1, wherein the connecting members comprise a pair of plate-shaped connecting strips, wherein the weakening device comprises one or more notches that are formed in the connecting strips.

9. The fastener as defined in claim 1, wherein the stabilizer is a dish-shaped stabilizer and the center pillar extends transversely to the dish-shaped stabilizer.

10. A fastener for attaching an attached article to an attaching object, comprising:
    a holding member arranged and constructed to hold the attached article; and
    an engagement leg arranged and constructed to engage an engagement hole formed in the attaching object, the holding member being separated from the engagement leg by a hollow space, the engagement leg is connected to the holding member via a plurality of spaced from each other connecting members extending within the hollow space;
    wherein the connecting members are arranged and constructed to be easily broken when a force is applied thereto.

11. A fastener for attaching an attached article to an attaching object, comprising:
    a holding member in a form of a buckle arranged and constructed to hold the attached article; and
    an engagement leg comprising a center pillar extending outwardly from a stabilizer, the center pillar arranged and constructed to engage an engagement hole formed in the attaching object, the buckle being separated from the stabilizer of the engagement leg by a hollow space; the stabilizer is connected to the buckle via at least a pair of spaced from each other connecting members extending within the hollow space;
    wherein the connecting members are arranged and constructed to be easily broken to facilitate separation between the stabilizer and the buckle when a force is applied thereto.

12. The fastener as defined in claim 11, wherein the stabilizer is a dish-shaped stabilizer and the center pillar extends transversely to the dish-shaped stabilizer.

13. The fastener as defined in claim 11, wherein a tying belt is connected to the buckle.

14. The fastener as defined in claim 13, wherein the tying belt is integrally connected to the buckle.

* * * * *